United States Patent
Curole et al.

(10) Patent No.: US 8,678,080 B2
(45) Date of Patent: Mar. 25, 2014

(54) WATER PROCESSING SYSTEMS AND METHODS

(71) Applicant: Shell Oil Company, Houston, TX (US)

(72) Inventors: Michael Alvin Curole, Baton Rouge, LA (US); Eugene Bruce Greene, Colorado Springs, CO (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/901,230

(22) Filed: May 23, 2013

(65) Prior Publication Data

US 2013/0255955 A1 Oct. 3, 2013

Related U.S. Application Data (62) Division of application No. 12/669,511, filed as application No. PCT/US2008/070315 on Jul. 17, 2008, now Pat. No. 8,469,092.

(60) Provisional application No. 60/950,710, filed on Jul. 19, 2007.

(51) Int. Cl.
*E21B 43/20* (2006.01)

(52) U.S. Cl.
USPC ....... 166/52; 166/75.11; 166/268; 166/305.1; 210/170.01; 210/266; 210/651; 210/687; 210/747.1

(58) Field of Classification Search
None
See application file for complete search history.

(56) References Cited

U.S. PATENT DOCUMENTS

| | | | |
|---|---|---|---|
| 3,208,528 A * | 9/1965 | Elliott et al. | 166/305.1 |
| 4,341,629 A | 7/1982 | Uhlinger | 210/128 |
| 4,723,603 A | 2/1988 | Plummer | 166/275 |
| 4,842,736 A | 6/1989 | Bray et al. | 210/321.61 |
| 4,900,450 A | 2/1990 | Schmidt | 210/679 |
| 5,238,574 A | 8/1993 | Kawashima et al. | 210/652 |
| 6,537,456 B2 | 3/2003 | Mukhopadhyay | 210/652 |
| 8,469,092 B2 * | 6/2013 | Curole et al. | 166/272.3 |
| 2006/0175061 A1 | 8/2006 | Crichlow | 166/302 |
| 2007/0102359 A1 | 5/2007 | Lombardi et al. | 210/639 |
| 2009/0056940 A1 * | 3/2009 | Minnich et al. | 166/266 |
| 2009/0056945 A1 * | 3/2009 | Minnich et al. | 166/272.3 |
| 2009/0308609 A1 | 12/2009 | Curole et al. | 166/275 |
| 2011/0241230 A1 * | 10/2011 | Kerfoot | 261/37 |

FOREIGN PATENT DOCUMENTS

| | | | | |
|---|---|---|---|---|
| WO | WO2005119007 | 12/2005 | | E21B 43/20 |
| WO | WO2006134367 | 12/2006 | | E21B 43/20 |
| WO | WO2007138327 | 12/2007 | | C02F 1/44 |

* cited by examiner

*Primary Examiner* — George Suchfield (57) ABSTRACT

A system comprising a well drilled into an underground formation comprising hydrocarbons; a water supply; a steam production facility, the steam production facility comprising a filter to remove at least 80% of a quantity of divalent cations in the water supply; an exchange resin to remove at least 80% of a quantity of divalent cations in a filtered water stream that has already passed through the filter; a steam injection facility connected to the well and the steam production facility, adapted to inject the steam into the well.

10 Claims, 5 Drawing Sheets

WATER PROCESSING SYSTEMS AND METHODS

PRIORITY CLAIM

This application is a divisional application of U.S. patent application Ser. No. 12/669,511 directed to "Water Processing Systems and Methods" filed Sep. 29, 2010, which claims the benefit of priority to U.S. Provisional Patent Application Ser. No. 60/950,710 filed Jul. 19, 2007.

FIELD OF THE INVENTION

The invention is related to seawater processing systems and methods, in particular to systems and methods to process boiler feed water.

BACKGROUND ART

Boilers generally require soft water for an input. Hard water may lead to the development of scale or other problems developing with the boiler components.

One way of reducing the hardness of water is to use lime soda softening, hot lime soda softening, or mechanical techniques such as mechanical vapor compression. All these systems are effective at reducing hardness, however they may develop a sludge or other waste products, be expensive to operate, require expensive chemical and/or manpower requirements, and/or require sizeable processing equipment.

Copending U.S. Patent Application 60/786,274, filed Mar. 27, 2006, discloses a system comprising a well drilled into an underground formation; a production facility at a topside of the well; a steam production facility connected to the production facility; wherein the steam production facility produces water by removing some ions and adding an agent which increases the viscosity of the water and/or increases a hydrocarbon recovery from the formation, and injects the water into the well.

U.S. Pat. No. 6,537,456 discloses a process for treatment of water via membrane separation to remove hardness and non-hydroxide alkalinity by simultaneous removal in a weak acid cation exchange resin. The process includes ionization of sparingly ionizable components, such as silica, by adjusting the pH up to about 10.5 or higher. Their separation by the membrane is significantly increased. The passage of boron, silica and TOC is reduced by a factor of ten or more. Recovery of 90% or higher is achievable with most brackish feedwaters, while substantial reduction in cleaning frequency is simultaneously achieved. The apparatus used for the water treatment process includes reverse osmosis membrane(s), mixed bed ion exchange unit, micron filter, ultraviolet sterilization unit, decarbonation unit, and electrodeionization unit. U.S. Pat. No. 6,537,456 is herein incorporated by reference in its entirety.

Published PCT Application WO 2007/138327 discloses a water treatment system and a method of providing a supply of water of controlled salinity suitable for injection into an oil bearing reservoir including the steps of: substantially desalinating a first feed supply of water to provide a first supply of treated water of low salinity; treating a second feed supply of water to provide a second supply of treated water having a reduced concentration of divalent ions in compartison to the second feed supply and a higher salinity than the first supply of treated water; and mixing the first supply of treated water and the second supply of treated water to provide a supply of mixed water having a desired salinity suitable for injection into an oil bearing reservoir. The first feed supply is preferably treated by reverse osmosis. The second feed supply is preferably treated by nanofiltration.

Published PCT Application WO 2005/119007 discloses a method of recovering hydrocarbons from a porous subterranean hydrocarbon-bearing formation comprising the steps of: a) feeding to at least on reverse osmosis unit of a desalination assembly a high salinity water feed stream having a total dissolved solids content (total salinity) of at least 10,000 ppm; b) driving a portion of the high salinity water feed stream across a membrane in the reverse osmosis unit of the desalination assembly at a pressure above the osmotic pressure of the high salinity water feed stream while excluding at least a portion of the dissolved solids from crossing said membrane to produce a treated low salinity water product stream having a total salinity of less than 5,000 ppm and a concentrated waste brine stream wherein the hydrostatic head exerted by the high salinity water feed stream on the feed side of the membrane provides at least a major component of the pressure required to overcome the osmotic pressure; c) injecting the low salinity water product stream into the hydrocarbon-bearing formation from an injection well; d) displacing the hydrocarbons with the low salinity water product stream toward an associated production well; and e) recovering hydrocarbons from the formation via the production well.

Published PCT Application WO 2005/119007 discloses a method of recovering hydrocarbons from a porous subterranean hydrocarbon-bearing formation comprising the steps of: a) feeding to at least on reverse osmosis unit of a desalination assembly a high salinity water feed stream having a total dissolved solids content (total salinity) of at least 10,000 ppm; b) driving a portion of the high salinity water feed stream across a membrane in the reverse osmosis unit of the desalination assembly at a pressure above the osmotic pressure of the high salinity water feed stream while excluding at least a portion of the dissolved solids from crossing said membrane to produce a treated low salinity water product stream having a total salinity of less than 5,000 ppm and a concentrated waste brine stream wherein the hydrostatic head exerted by the high salinity water feed stream on the feed side of the membrane provides at least a major component of the pressure required to overcome the osmotic pressure; c) injecting the low salinity water product stream into the hydrocarbon-bearing formation from an injection well; d) displacing the hydrocarbons with the low salinity water product stream toward an associated production well; and e) recovering hydrocarbons from the formation via the production well. Published PCT Application WO 2005/119007 is herein incorporated by reference in its entirety.

Accordingly, there is a need in the art for a water processing system that produces reduced sludge and other waste products.

There is a further need in the art for a boiler water processing system that is less expensive to operate.

There is a further need in the art for a boiler water processing system that can operate without expensive chemical and/or manpower requirements.

There is a further need in the art for a boiler water processing system that operates with smaller and/or lighter processing equipment.

There is a further need in the art for a water processing system that produces steam and/or water for use in enhanced oil recovery processes.

SUMMARY OF THE INVENTION

In one aspect, the invention relates to a system comprising a well drilled into an underground formation comprising hydrocarbons; a water supply; a steam or water production facility, the steam or water production facility comprising a filter to remove at least 80% of a quantity of divalent cations in the water supply; an exchange resin to remove at least 80% of a quantity of divalent cations in a filtered water stream that has already passed through the filter; a steam or water injection facility connected to the well and the steam or water production facility, adapted to inject the steam and/or water into the well.

In another aspect, the invention relates to a method comprising filtering a water supply to remove at least 80% of a quantity of divalent cations from the water; further processing the filtered water with an exchange resin to remove at least 80% of a remaining quantity of divalent cations from the filtered water; and boiling the filtered and processed water to produce steam.

Other aspects and advantages of the invention will be apparent from the following description and the appended claims.

BRIEF DESCRIPTION OF DRAWINGS

Certain aspects of the system of the present invention are shown in the drawings herewith in which.

DETAILED DESCRIPTION

In one aspect, embodiments disclosed herein relate to water treatment processes and systems. In particular, embodiments disclosed herein relate to the treatment of high salinity water to produce a lower salinity water capable of being used as a boiler feed water for steam generation to be used in offshore enhanced oil recovery operations.

Figure 1:
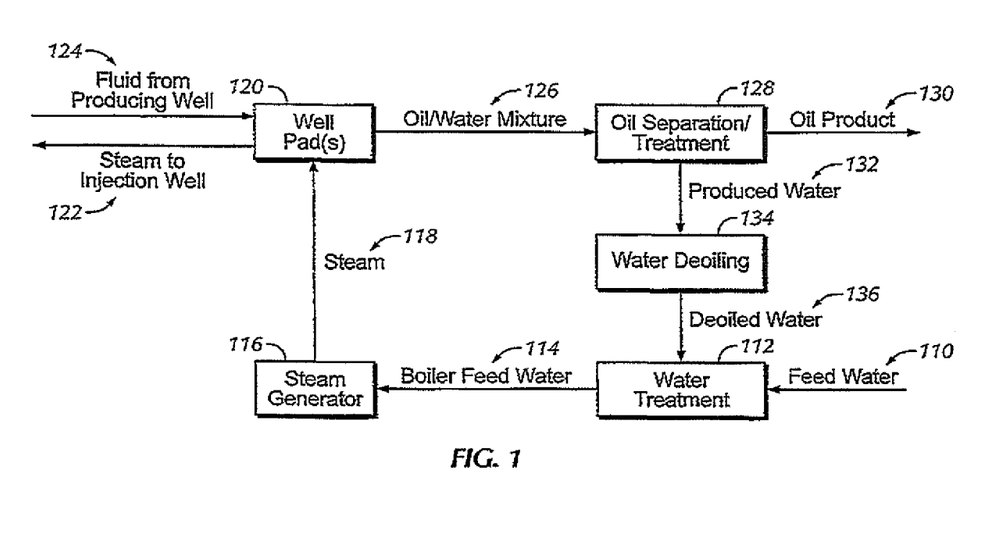
FIG. 1 is a feed water processing system.

FIG. 1—Feed Water Processing System

Referring to FIG. 1, a steam injection cycle aspect of one embodiment of a system of the present invention is shown. As shown in FIG. 1, a feed water 110 is subjected to a water treatment process 112 to produce a boiler feed water 114. Feed water 110, prior to being sent to a "once-through" steam generator 116 for creation of steam 118 for oil recovery operations, is desalinated in water treatment process 112. Typically, the steam generator 116 requires that boiler feed water 114 have a total dissolved salts (TDS) of less than 8,000 ppm. However, one of ordinary skill in the art would recognize that depending on the type of steam generator used, the TDS requirements may vary and may for example, be as low as 500, 250, 100, or close to 0 ppm. The TDS of the feed water 110, prior to treatment may vary depending on the source; however, in offshore operations, the feed water 110 is typically seawater having a TDS ranging from 30,000 ppm to 40,000 ppm.

High pressure steam 118 produced in steam generators 116 is transferred to well pad 120 and injected via steam injection wells 122 to fluidize oil within the formation. Steam 118 eventually condenses and an oil/water mixture results that migrates through the formation. The oil/water mixture 126 is produced from producing wells 124. The oil/water mixture 126 is sent to an oil/water separator 128 in which the oil product 130 is separated from the water and recovered for sale. The produced water stream 132 is further de-oiled in a de-oiling process 134. The de-oiled water stream 136 is then combined with feed water 110 and subjected to water treatment 112 for further reuse in a steam injection or other operations.

In some embodiments, boiler feed water 114 may bypass steam generator 116 and be injected directly into injection wells 122 in a liquid phase, and/or injected directly into injection wells 122 as a mixture with steam 118.

Figure 2:
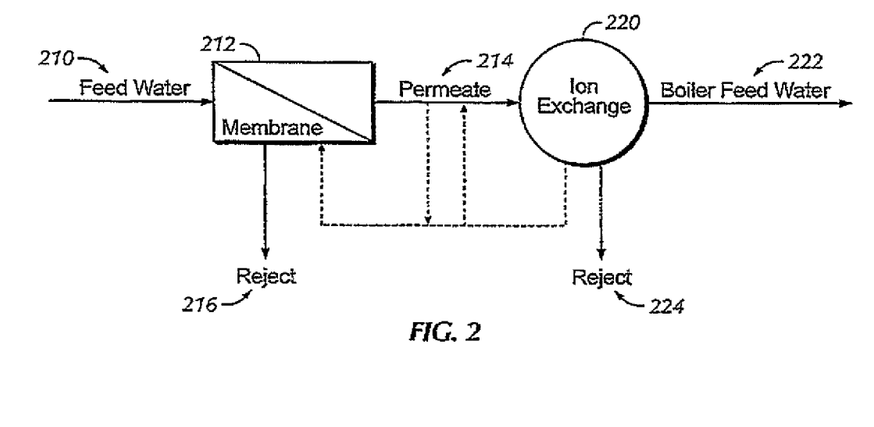
FIG. 2 is a feed water processing system.

FIG. 2—Feed Water Processing System

Referring to FIG. 2, a water treatment process according to a certain aspect of one embodiment of a system of the present invention is shown. As shown in FIG. 2, feed water 210 is introduced to membrane 212 for a first desalination process by which feed water is separated into a permeate stream 214 and a reject stream 216. The permeate stream 214 from the membrane 212 then enters ion exchanger 220 for a second desalination process. The second desalination process in ion exchanger 220 produces a boiler feed stream 222 having a TDS level suitable for use in steam generator (not shown) and a reject stream 224.

Membrane 212 may be an ion selective membrane, which may selectively prevent or at least reduce hardening or scale-forming ions (e.g., sulfate, calcium, magnesium, and bicarbonate ions) from passing across it, while allowing water and harmless ions (e.g., sodium and potassium ions) to pass across it. The selectivity of a membrane may be a function of the particular properties of the membrane, including pore size and electrical charge of the membrane. For example, a polyamide membrane may be used to selectively prevent or at least reduce sulfate, calcium, magnesium, and bicarbonate ions across it. In a particular embodiment, membrane 212 may reduce the hardness ions (i.e., divalent cations) present by at least 90 percent, or by at least 95 percent in yet another embodiment.

Membrane 212 may be a nanofiltration membrane. Examples of commercially available nanofiltration membranes suitable for use in the treatment process of the present disclosure may include SEASOFT™ 8040 DK, SEASOFT™ 8040DL, and DESAL® DS-5, all of which are available from GE Osmonics (Trevose, Pa.), and FILMTEC™ NF 200 Series, which is available from The Dow Chemical Company (Minneapolis, Minn.).

With respect to ion exchanger 220, one of ordinary skill in the art would recognize that the type of ion exchanger may depend on the salinity of the permeate stream 214 and the salinity requirements of the steam generator to which the boiler feed water 222 is fed. Types of ion exchangers which are suitable for use in the present treatment process may include weak acid cation resin exchangers, strong acid cation resin exchangers, and/or chelating cation exchangers. Strong acid cation resin exchangers are typically limited to a water having TDS of about 5,000 ppm with low hardness, whereas weak acid cation resin exchangers may soften a water of seawater salinity of about 36,000 ppm, and chelating cation exchangers may remove hardness from a saturated brine. Generally, as salinity of a feed water increases, hardness becomes a significant cost of operation; however, the cost of operation may also include the cost of the regenerant for regenerating the ion exchanger. For example, a strong acid cation resin exchanger typically uses a sodium chloride regenerant while weak acid cation resin exchangers and chelating cation exchangers may use acid and caustic regenerants and thus, an ion exchanger may be selected based on the TDS of the feed water.

One mechanism by which a weak acid cation resin exchanger may remove hardness from a feed stream is as follows:

After leaving membrane 212, the permeate stream 214 may take a subsequent pass through membrane 212, prior to entry into ion exchanger 220. Further, while FIG. 2 is illustrated as having only a single membrane 212, one of ordinary skill in the art would recognize that the subsequent pass may be taken through the same or an additional membrane 212. Alternatively, each membrane may have multiple arrays. For example, in a two array membrane, the feed to the first array may be partitioned into a reject stream and a permeate stream. The reject from the first array may then become the feed to the second array. The second array may then partition its feed into a reject stream and a permeate stream. The permeate stream from the two array membrane may include the permeate streams from each of the arrays. Further, between the multiple membranes and/or arrays, a booster pump may be included to overcome the osmotic pressure increase due to the increased salinity of the reject stream of the first array/membrane between the arrays/membranes.

Additionally, various types and/or combinations of membranes, such as a nanofiltration or a reverse osmosis membrane may be used. For example, the first membrane may be a nanofiltration membrane, and the permeate stream from the nanofiltration membrane may take a second pass through a reverse osmosis membrane. The design of membrane should have no limitation on the scope of the present disclosure; rather, the membrane may be, for example, spirally wound, hollow fiber, tubular, plate and frame, or disc-type, or other designs as are known in the art.

Further, depending on the type of membrane being used, the feed stream 210 may be pressurized to the appropriate pressure below the osmotic pressure of the solution prior to entry into the filtration membrane 212. Seawater has an osmotic pressure of about 24 bar; thus, pressurization of at least 30 to 110 bars may be exerted on the feed stream 210 for a nanofiltration membrane, and pressurization of at least 40 bar for reverse osmosis.

Examples of commercially available reverse osmosis membranes suitable for use in the treatment process of the present disclosure may include AG™ 8040F and AG 8040-400, which are available from GE Osmonics (Trevose, Pa.) and FILMTEC™ SW 30 Series, which is available from The Dow Chemical Company (Minneapolis, Minn.).

The effluent from the ion exchanger 220 (boiler feed water stream 222) may take a subsequent pass through ion exchanger 220 and/or membrane 212. One of ordinary skill in the art would appreciate that by recycling at least a portion of the desalinated or partially desalinated stream from either the membrane 212 and/or the ion exchanger 220, a lower TDS may potentially be achieved with lower operating pressures.

In some embodiments, boiler feed water 222 may then be passed to a boiler to produce steam, which could be used in an enhanced oil recovery operation.

In some embodiments, boiler feed water 222 may then be used in an enhanced oil recovery operation, for example by being injected into a formation. Optionally, one or more additives such as surfactants and/or polymers as are known in the art could be mixed with the water prior to being injected, or the water could be used without any additives.

Figure 3:
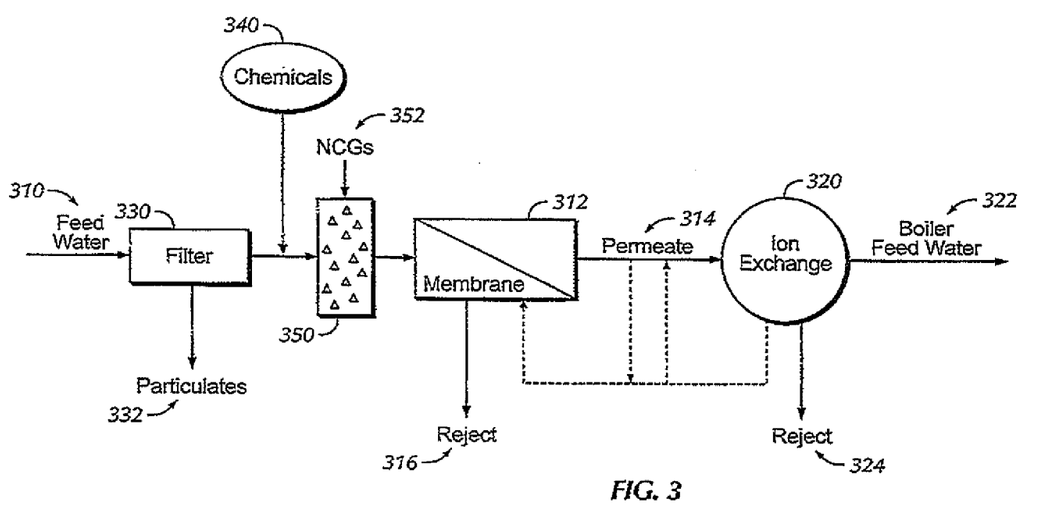
FIG. 3 is a feed water processing system.

FIG. 3—Feed Water Processing System

Referring to FIG. 3, a water treatment process useful in certain aspects of an embodiment of a system of the present invention is shown. As shown in FIG. 3, feed water 310 is introduced to filter 330 to remove particulate matter 332 suspended therein. Various types of filters, including for example, sand or media filters, cartridge filters, ultra filters, and/or microfilters, and other filter types may be used. The feed water may be filtered to have a silt density index of five or better.

After the particulate matter 332 is filtered out, chemicals 340 may be added to the feed water stream 310. Types of chemicals that may be added to the feed stream may include, for example, acids, biocides, anti-scaling agents, and/or chelating agents. A suitable acid, such as sulfuric acid, hydrochloric acid, or any other suitable inorganic or organic acid may be optionally added to reduce the pH to a desirable value. The pH may be reduced to a pH from about 4 to about 8, or from about 5.5 to about 6.5. A biocide to prevent or reduce microbial spoilage and/or to control souring and corrosion caused to sulphate reducing bacteria, such as a bromine- or nitrile-based compounds, quaternary ammounium compounds, isothiazolinones, glutaraldehyde, and/or thiocyanates, may be added. Additionally, an anti-scaling agent, such as polyacrylic acid, and/or a metal chelating agent such as ethylenediamine tetraacetic acid (EDTA) and sodium hexametaphosphate (SHMP) may also be added to the feed water.

Feed water 310 then passes through a deaerator 350, wherein free non-condensable gases, such as oxygen, carbon dioxide, and nitrogen, dissolved in the feed water 310 may be removed. A sufficient quantity of acid 340 may introduced to lower the pH sufficiently so that bound carbonates are converted to free gaseous carbon dioxide.

The feed water then enters membrane 312 for a first desalination process by which feed water 312 is separated into a permeate stream 314 and a reject stream 316. The permeate stream 314 from the membrane 312 then enters ion exchanger 320 for a second desalination process. The second desalination process in ion exchanger 320 produces a boiler feed stream 322 having a TDS level suitable for use in steam generator (not shown) and a reject stream 324. Membrane 312 may be a nanofiltration membrane.

After leaving membrane 312, the permeate stream 314 may take a subsequent pass through membrane 312, prior to entry into ion exchanger 320. While FIG. 3 is illustrated as having only a single membrane 312, one or more subsequent passes may be taken through the same or additional membranes (not shown). Various types of membranes, such as a nanofiltration membrane and/or a reverse osmosis membrane may be used. For example, the first membrane may be a nanofiltration membrane, and the permeate stream from the nanofiltration membrane may take a second pass through a reverse osmosis membrane.

In yet another embodiment, the effluent from the ion exchanger 320 (either boiler feed water stream 322 or reject stream 324) may take a subsequent pass through ion exchanger 320 and/or membrane 312.

Further, while FIG. 3 shows the feed water 310 being exposed to chemical additives 340 and deaerator 350 prior to introduction to membrane 312, such relative location is not intended to be a limitation on the scope of the present disclosure. Rather, chemical additives 340 and/or deaerator 350 may be between membrane 312 and ion exchanger 320. Further, filter 330, chemical additives 340 and/or deaerator 350 may excluded from the water treatment process of the present disclosure.

In some embodiments, boiler feed water 322 may then be passed to a boiler to produce steam, which could be used in an enhanced oil recovery operation, for example by being injected into an injection well, in a huff and puff process, in a SAGD process, or in other EOR processes as are known in the art.

In some embodiments, boiler feed water 322 may then be used in an enhanced oil recovery operation, for example by being injected into a formation. Optionally, one or more additives such as surfactants and/or polymers as are known in the art could be mixed with the water prior to being injected, or the water could be used without any additives.

Figure 4:
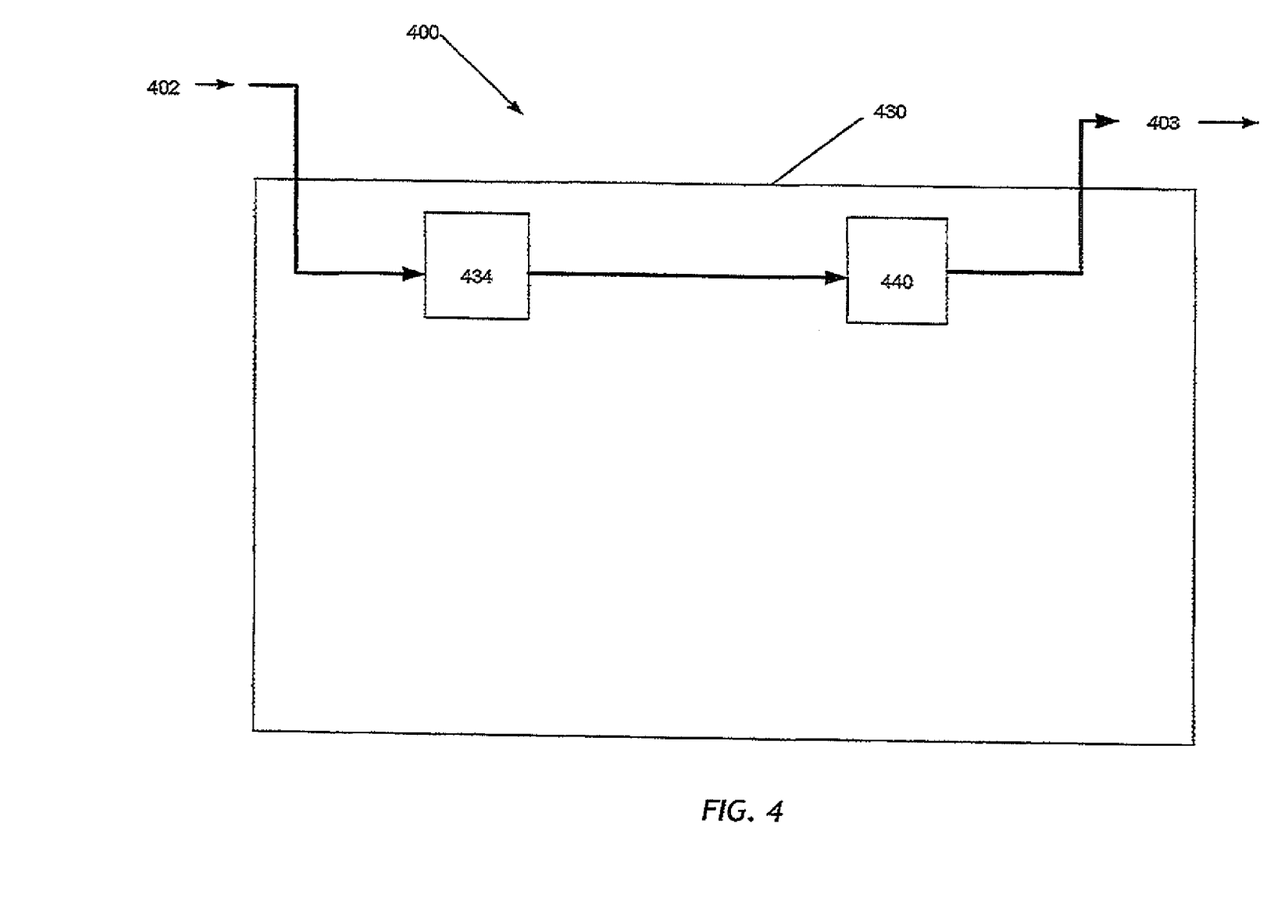
FIG. 4 is a feed water processing system.
Figure 5:
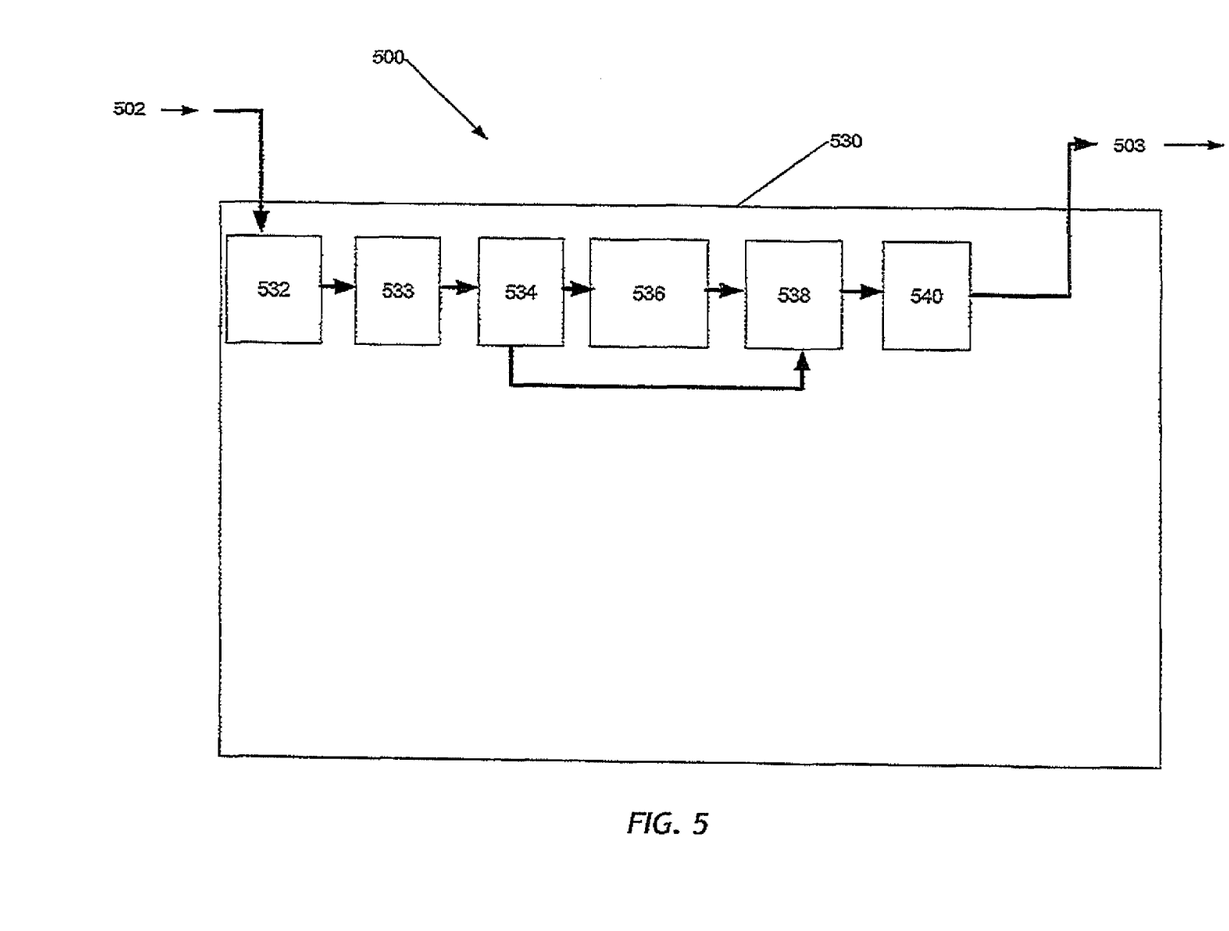
FIG. 5 is a feed water processing system.

FIGS. 4 & 5—Feed Water Processing Systems

Referring now to FIG. 4, in some embodiments of the invention, certain aspects of a system 400 for steam production 430 are illustrated. Steam production 430 has an input of unprocessed water, for example water from a body of water, from a well, seawater, city water supply, or another water supply. At 434 some cations may be removed from raw water 402, for example multivalent cations, such as divalent or trivalent cations. At 440, processed water may be sent to a boiler in order produce steam. Steam 403 is then produced from steam production 430.

Referring now to FIG. 5, in some embodiments of the invention, system 500 for steam production 530 is illustrated. Steam production 530 has an input of unprocessed water 502, for example water from the body of water from a well, sea water, city water supply, or another water supply.

At 532, primary filtration may be accomplished to remove solids from water.

At 533 sulphates (SO4) may be removed. At 534, some divalent cations may be removed, for example from about 60 to about 99% of the divalent cations present. Divalent cations which may be removed include magnesium (Mg), calcium (Ca), iron (Fe) and/or strontium (Sr). In some embodiments, 533 and 534 may be performed at the same time with a nanofiltration membrane system.

At 536, optionally, some monovalent ions may be removed, for example from about 60 to about 99% of the cations present, such as sodium (Na), and/or potassium (K), along with the associated anions, for example chloride, fluoride, and/or bromide.

At 538, additional divalent cations may be removed from the water, for example lowering the amount of magnesium, calcium, and/or strontium to less than about 1%, less than about 0.5%, less than about 0.1%, or less than about 0.01%, of those divalent cations as compared to the raw input water 502. In one example, additional divalent cations may be removed with the use of a weak acid ion exchange resin At 540, water may be passed to a boiler to produce steam. Steam 503 may be produced by steam production 530.

In some embodiments, water may bypass boiler 540, and output stream 503 may be liquid water which could be used to be injected into a formation in a water flood EOR operation.

In some embodiments, steam production 430 and/or 530 may use a membrane based system, for example reverse osmosis (RO) and/or nanofiltration (NF) technology, such as are used for seawater desalination, filtration, and/or purification.

The driving force for permeation for membrane separation may be the net pressure across the membrane; this is defined as the feed pressure minus the permeate or back pressure, less the difference between the osmotic pressure of the feed and the osmotic pressure of the permeate.

U.S. Pat. No. 4,723,603 employs NF membranes for specific removal of sulfate from seawater. Sulfates may be removed by NF membranes, and the NF permeate, may be rich in sodium chloride but deficient in sulfate. U.S. Pat. No. 4,723,603 is herein incorporated by reference in its entirety.

U.S. Pat. No. 4,341,629 discloses desalinating seawater by using two RO modules, which can include the same membrane, e.g. a 90% rejection cellulose triacetate (CTA) RO membrane, or two different membranes, e.g. an 80% rejection CTA membrane and a 98% rejection CTA membrane. U.S. Pat. No. 4,341,629 is herein incorporated by reference in its entirety.

U.S. Pat. No. 5,238,574 discloses the use of a multiplicity of RO membrane modules to process seawater. For example, a first low-pressure RO membrane may be followed by a high pressure RO membrane, or a series of low pressure RO membranes can be used, to either provide permeate of varying water quality or simply to produce a combined permeate where the concentrate stream from one module becomes the feedstream for the next module in series. U.S. Pat. No. 5,238,574 is herein incorporated by reference in its entirety.

In some embodiments, system 500 may include unprocessed water 502, from an aqueous feed source such as seawater from the ocean, or any saline water source having some divalent and monovalent ions, such as produced water from a well. As one example, raw seawater may be taken from the ocean, either from a sea well or from an open intake, and initially subjected to primary filtration 532 using a large particle strainer (not shown), and/or multi-media filters, which might be typically sand and/or anthracite coal, optionally followed by a cartridge filtration.

In some embodiments, processes 533, 534, and/or 536 can include one or a plurality of RO cartridges which may be located downstream of one or a plurality of NF cartridges. RO cartridges and/or NF cartridges may be spirally wound semipermeable membrane cartridges, or cartridges made using hollow fiber technology having suitable membrane characteristics. For example, E. I. DuPont sells RO cartridges of hollow fine fiber (HFF) type, which are marketed by DuPont as their HFF B-9 cartridges and which may be used. A spirally wound semipermeable membrane cartridge may include a plurality of leaves which are individual envelopes of sheet-like semipermeable membrane material that sandwich therebetween a layer of porous permeate carrying material, such as polyester fibrous sheet material. The semipermeable membrane material may be any of those commercially available materials. Interleaved between adjacent leaves may be lengths of spacer material, which may be woven or other open mesh, screen-like crosswise designs of synthetic filaments, e.g. cross-extruded filaments of polypropylene or the like such as those sold under the trade names Vexar and Nalle, that provide flow passageways for the feed water being pumped from end to end through a pressure vessel. A lay-up of such alternating leaves and spacer sheets may then be spirally wound about a hollow tube having a porous sidewall to create a right circular cylindrical cartridge.

One spirally wound separation cartridge is disclosed in U.S. Pat. No. 4,842,736, the disclosure of which is incorporated herein by reference, which provides a plurality of spiral feed passageways which extend axially from end to end of the ultimate cartridge, through which passageways the feed liquid being treated flows in an axial direction. Internally within the membrane envelopes, the permeating liquid flows along a spiral path inward in a carrier material until it reaches the porous central tube where it collects and through which it then flows axially to the outlet.

In some embodiments, RO cartridges and/or NF cartridges may be selected so as to accomplish the desired overall function of producing a stream of processed water having the desired ionic concentrations from seawater or the like. RO elements or cartridges may be selected from suitable semipermeable membranes of the polyamide composite membrane variety, wherein a thin film of polyamide may be interfacially formed on a porous polysulfone support or the like that may be in turn formed on a highly porous fibrous backing material. RO membranes may be designed to reject more than about 95% of dissolved salts, for example about 98% or more.

Suitable commercially available RO membranes include those sold as AG8040F and AG8040-400 by Osmonics; SW30 Series and LE by Dow-FilmTec; as Desal-11 by Desalination Systems, Inc.; as ESPA by Hydranautics; as ULP by Fluid Systems, Inc.; and as ACM by TriSep Corporation.

NF membranes may be employed which are designed to selectively reject divalent or larger ions, and the NF elements or cartridges which are used may reject a minimum of about 80%, for example more than about 90%, or about 95%, or about 98% of the divalent or larger ions in an aqueous feed. Optionally, the NF membrane may also at least moderately reduces the monovalent ion content, for example less than about 70%, or less than about 50%, or less than about 30%, or less than about 20% of the monovalent ion content. Suitable commercially available NF membranes can be purchased either in sheet form or in finished spirally wound cartridges, and include those sold as Seasoft 8040DK, 8040DL, and Sesal DS-5 by Osmonics; as NF200 Series and NF-55, NF-70 and as NF-90 by Dow-Film Tec; as DS-5 and DS-51 by Desalination Systems, Inc., as ESNA-400 by Hydranautics; and as TFCS by Fluid Systems, Inc.

In some embodiments, a mechanical method, such as passing the unprocessed water 502 through a nano-filtration membrane, may be used to remove ions from the water at the surface. Sea water may contain from about 2700 to about 2800 ppm of divalent SO4-. The nano-filtration membrane process may reduce this concentration 533 to about 20 to about 150 ppm. Up to about a 99% reduction in sulfate content may be achievable.

In some embodiments, chemicals and/or additives may be injected into the untreated water 502 to inhibit the in-situ growth of crystals from insoluble salt precipitation. A variety of additives may be injected into the water at the surface.

In some embodiments, salt water may be processed 533, 534, and/or 536 by multistage flash distillation, multieffect distillation, reverse osmosis and/or vapor compression distillation. Membrane technologies have been used in the pretreatment of salt water to reduce the high ionic content of salt water relative to fresh water. Ion selective membranes may be used which selectively prevent certain ions from passing across it while at the same time allowing the water and other ions to pass across it. The selectivity of a membrane may be a function of the particular properties of the membrane, including the pore size or electrical charge of the membrane. Accordingly, any of the known and commercially available ion selective membranes which meet these criteria can be used. For example, a polyamide membrane is particularly effective for selectively preventing sulfate, calcium, magnesium and bicarbonate ions from passing across it, and could be used for processes 533 and/or 534. A polyamide membrane having the trade name SR90-400 (Film Tec Corporation) or Hydranautics CTC-1 may be used.

In some embodiments of the invention, unprocessed water 502 containing a high concentration of hardness ions (for example divalent cations) is passed through an ion selective membrane 534 to form a softened salt water having a reduced concentration of hardness ions.

Microfiltration (MF), ultrafiltration (UF), nanofiltration (NF), and reverse osmosis (RO) are all pressure-driven separation processes allowing a broad range of neutral or ionic molecules to be removed from fluids. Microfiltration may be used for removal of suspended particles greater than about 0.1 microns. Ultrafiltration may be used to exclude dissolved molecules greater than about 5,000 molecular weight. Nanofiltration membranes may be used for passing at least some salts but having high rejection of organic compounds having molecular weights greater than approximately 200 Daltons. Reverse osmosis membranes may be used for high rejection of almost all species. While NF and RO are both capable of excluding salts, they typically differ in selectivity. NF membranes commonly pass monovalent ions while maintaining high rejection of divalent ions. By contrast, reverse osmosis membranes are relatively impermeable to almost all ions, including monovalent ions such as sodium and chloride ions. NF membranes have sometimes been described as "loose" RO membranes. One suitable membrane capable of removing dissolved salts from water is the cellulose acetate membrane, with selectivity resulting from a thin discriminating layer that is supported on a thicker, more porous layer of the same material. Another suitable membrane is made of piperazine or substituted piperazine. Other suitable membranes include polymers such as the commercial FilmTec NF40 NF membranes.

In some embodiments, a spiral-wound filter cartridge may be used to incorporate large amounts of RO or NF membrane into a small volume. Such an element can be made by wrapping feed spacer sheets, membrane sheets, and permeate spacer sheets around a perforated permeate tube.

In some embodiments, interfacial polymerization may be used to make thin film composite membranes for RO and NF separations. This process is commonly performed as a polycondensation between amines and either acid chlorides or isocyanates.

Reverse osmosis membranes may have high rejection of virtually all ions, including sodium and chloride. NF membranes are often characterized as those having a substantial passage of neutral molecules having molecular weights less than 200 daltons and monovalent ions. NF membranes still commonly possess high rejection of divalent ions due to charge interactions. Membranes having a continuum of properties between RO and NF can also be produced. In addition to high rejection of at least one species, commercial membranes often possess high water permeability.

In some embodiments, membranes for RO and/or NF may be piperazine-based membranes, where at least 60% of amine-containing monomers incorporated into the polymer may be piperazine or piperazine derivative molecules. One typical example of a piperazine-based membrane is the FilmTec NF40 NF membrane, which has been made by contacting piperazine and TMC in the presence of an acid acceptor, N,N-dimethylpiperazine. The FilmTec commercial membranes NF45 and SR90 have been made by similar processes, with additional proprietary chemicals added to the water and/or organic phase. A particularly useful property of some membranes is the ability to selectively remove some molecules while retaining others. For example, the dairy industry has used piperazine-based membranes to concentrate large neutral molecules (whey and lactose) while removing minerals. In other cases it is desired to pass monovalent salts while maintaining high rejection of divalent ions.

In some embodiments, processes 434, 533, and/or 534 may use a NF device, such as a membrane. In some embodiments, processes 434 and/or 536 may use a RO device, such as a membrane.

In some embodiments of the invention, processed steam 403 and/or 503 may be used to improve oil recovery. The processed steam 403 and/or 503 may be utilized to drive or push oil out of the reservoir, thereby "sweeping" crude oil out of the reservoir, and/or by heating the oil in the reservoir allowing it to flow. Oil may be recovered at one or more production wells spaced apart from one or more injection wells as processed steam pushes the oil out of the pores in the formation and to the production wells. Once the oil/water reaches the surface, it may be put into holding tanks, allowing the oil to separate from the water through the natural forces of gravity.

The process and system may be useful for the displacement recovery of petroleum from oil-bearing formations. Such recovery encompasses methods in which the oil may be removed from an oil-bearing formation through the action of a displacement fluid or a gas. Thus, the recovery may be secondary, where the reservoir hydrocarbons have been substantially depleted by primary recovery mechanisms. Other uses for the processed steam 403 and/or 503 prepared by the process and system of the invention include near wellbore injection treatments.

Additionally, while the above embodiments were described as being application for offshore water treatment, one of ordinary skill in the art would appreciate that the treatment techniques may also be used in onshore operations, particularly when the feed water has a high salinity.

Illustrative Embodiments

In one embodiment according to the present invention, there is disclosed a system comprising a well drilled into an underground formation comprising hydrocarbons; a water supply; a steam production facility, the steam production facility comprising a filter to remove at least 80% of a quantity of divalent cations in the water supply; an exchange resin to remove at least 80% of a quantity of divalent cations in a filtered water stream that has already passed through the filter; a steam injection facility connected to the well and the steam production facility, adapted to inject the steam into the well. In some embodiments, the system also includes a second well drilled into the underground formation; and a hydrocarbon production facility at a topside of the second well. In some embodiments, the exchange resin comprises at least one of a weak acid ion exchange resin and/or a chelating cation exchange resin. In some embodiments, the underground formation is beneath a body of water. In some embodiments, the steam production facility is above a body of water, such as on a production platform. In some embodiments, the system also includes a water pumping apparatus, adapted to pump water from the water supply to the steam production facility. In some embodiments, the steam production facility has an input water having a total dissolved salts value of at least 15,000 parts per million, expressed as sodium chloride dissolved. In some embodiments, the well comprises a diameter from 10 to 25 cm. In some embodiments, the filter removes at least 95% of the quantity of divalent cations. In some embodiments, the filter removes at least 99% of the quantity of divalent cations.

In one further embodiment of the present invention, there is disclosed a method comprising filtering a water supply to remove at least 80% of a quantity of divalent cations from the water; further processing the filtered water with an exchange resin to remove at least 80% of a remaining quantity of divalent cations from the filtered water; and boiling the filtered and processed water to produce steam. In some embodiments, the method also includes injecting the steam into an underground formation, the formation comprising oil. In some embodiments, at least a portion of the water supply is water produced from an underground formation. In some embodiments, at least a portion of the water supply is seawater. In some embodiments, the method also includes removing some monovalent cations from the water. In some embodiments, filtering the water supply removes at least 90% of the quantity of divalent cations. In some embodiments, filtering the water supply removes at least 95% of the quantity of divalent cations. In some embodiments, filtering the water supply removes at least 99% of the quantity of divalent cations. In some embodiments, further processing the filtered water with an exchange resin removes at least 90% of the remaining quantity of divalent cations from the filtered water. In some embodiments, further processing the filtered water with an exchange resin removes at least 95% of the remaining quantity of divalent cations from the filtered water. In some embodiments, further processing the filtered water with an exchange resin removes at least 99% of the remaining quantity of divalent cations from the filtered water. In some embodiments, the steam is injected from 10 to 100 bars above a reservoir pressure. In some embodiments, the oil in the underground formation prior to steam being injected has a viscosity from 5 cp to 10,000 cp. In some embodiments, the oil in the underground formation prior to steam being injected has a viscosity from 500 cp to 5,000 cp. In some embodiments, the underground formation has a permeability from 5 to 0.0001 Darcy. In some embodiments, the underground formation has a permeability from 1 to 0.001 Darcy. In some embodiments, the water supply has a total dissolved salts value of at least 15,000 parts per million, expressed as sodium chloride dissolved, prior to the filtering and further processing steps.

EXAMPLES

Performance predictions for nanofiltration membranes and reverse osmosis membranes are conducted and compared. Table 1 shows the composition of the feed water (sea water) used in the performance predictions

TABLE 1

| Element | ppm |
| --- | --- |
| Mg | 1313 |
| Ca | 427 |
| Na | 10823.7 |
| K | 390 |
| SO4 | 2735 |
| HCO3 | 150 |
| Cl | 19525 |
| TDS | 35363.7 |

The performance of nanofilter membranes and reverse osmosis membranes at reducing the salinity of the seawater shown above in Table 1 is predicted. The performance of nanofilter membranes is predicted at 45 and 65° F. The permeate from the nanofilter membranes is the feed that is then passed through reverse osmosis membranes at temperatures of 46, 56, and 110° F. Both the nanofilter and reverse osmosis membranes use a two array system. In this system, the feed to array 1 is partitioned into a reject stream and a permeate stream. The reject from array 1 then becomes the feed to array 2. Array 2 then partitions the feed into a reject stream and a permeate stream.

TABLE 2

| Membrane | Nanofilter | Nanofilter | Reverse Osmosis | Reverse Osmosis | Reverse Osmosis |
|---|---|---|---|---|---|
| Temperature | 65 F. (18 C.) | 45 F. (7 C.) | 45 F. (7 C.) | 65 F. (18 C.) | 110 F. (43 C.) |
| Membrane Type | DKF 8040 | DKF 8040 | AE 8040F | AE 8040F | AE 8040F |
| Feed | Seawater | Seawater | NF Permeate | NF Permeate | NF Permeate |
| Million Barrels per Day (MBD) | 275 | 275 | 151 | 151 | 151 |
| TDS (ppm) | 35500 | 35500 | 20290 | 22756.9 | 22756.9 |
| Product (MBD) | 205 | 205 | 100 | 100 | 100 |
| Recovery | 75% | 75% | 66% | 66% | 66% |
| Membrane Arrays | 2 | 2 | 2 | 2 | 2 |
| Feed Pressure (psi) | 343 | 454 | 960 | 800 | 624 |
| $2^{nd}$ Stage Boost | 90 | 90 | 250 | 250 | 300 |
| Array 1 | | | | | |
| No. of Pressure Vessels | 182 | 182 | 80 | 80 | 80 |
| No. of Elements | 1092 | 1092 | 480 | 480 | 480 |
| Recovery | 51% | 52% | 45% | 46.6% | 46% |
| Array 2 | | | | | |
| No. of Pressure Vessels | 92 | 92 | 40 | 40 | 40 |
| No. of Elements | 552 | 552 | 240 | 240 | 240 |
| Recovery | 48% | 48% | 37% | 36.2% | 36% |
| Permeate Array 1 | | | | | |
| Mg (mg/L) | 33.6 | 20.6 | | | |
| Ca (mg/L) | 16.4 | 10.1 | | | |
| Na (mg/L) | 7642 | 6503.2 | | | |
| K (mg/L) | 275 | 234.3 | | | |
| SO4 (mg/L) | 4.9 | 3 | | | |
| HCO3 (mg/L) | 9.2 | 5.8 | | | |
| Cl (mg/L) | 12163 | 10322.4 | | | |
| TDS (mg/L) | 20144.1 | 17099.4 | | | |
| Permeate Array 2 | | | | | |
| Mg (mg/L) | 59.9 | 38.1 | | | |
| Ca (mg/L) | 29 | 18.7 | | | |
| Na (mg/L) | 10778 | 10482 | | | |
| K (mg/L) | 388.4 | 377 | | | |
| SO4 (mg/L) | 10.7 | 6.9 | | | |
| HCO3 (mg/L) | 19.5 | 13.1 | | | |
| Cl (mg/L) | 17195 | 16621.4 | | | |
| TDS (mg/L) | 28480.5 | 27537.2 | | | |
| Combined | | | Overall Permeate | Overall Permeate | Overall Permeate |
| Mg (mg/L) | 41.8 | 25.9 | 0.4 | 0.6 | 1.3 |
| Ca (mg/L) | 20.3 | 12.8 | 0.2 | 0.3 | 0.7 |
| Na (mg/L) | 8621.8 | 7713.4 | 89 | 130 | 277.6 |
| K (mg/L) | 310.7 | 277.9 | 3.2 | 4.6 | 9.9 |
| SO4 (mg/L) | 6.7 | 4.2 | 0 | 0.1 | 0.1 |
| HCO3 (mg/L) | 12.5 | 8.1 | 0.1 | 0.2 | 0.3 |
| Cl (mg/L) | 13734.9 | 12248 | 141.8 | 208 | 441.7 |
| TDS (mg/L) | 22748.7 | 20290.3 | 234.9 | 342 | 731.6 |
| pH | | | 5.1 | 5.2 | 5.5 |

TABLE 2-continued

| Membrane | Nanofilter | | Nanofilter | | Reverse Osmosis | Reverse Osmosis | Reverse Osmosis |
|---|---|---|---|---|---|---|---|
| Reject | Array 1 | Array 2 | Array 1 | Array 2 | | | |
| Mg (mg/L) | 2672.8 | 5111.2 | 2713.9 | 5156.6 | 122.4 | 122.1 | 120.7 |
| Ca (mg/L) | 863.4 | 1642.1 | 878.8 | 1664.1 | 58.3 | 58.1 | 57.4 |
| Na (mg/L) | 14205.3 | 17403 | 15506.9 | 20112.4 | 25132.1 | 25079.6 | 24796.2 |
| K (mg/L) | 511.8 | 627.1 | 558.7 | 724.7 | 903.7 | 900 | 890.8 |
| SO4 (mg/L) | 5636.6 | 10887 | 5696.3 | 10890.2 | 19.6 | 19.8 | 19.5 |
| HCO3 | 299.6 | 561 | 306.3 | 573.9 | 36.3 | 36.2 | 35.7 |
| Cl (mg/L) | 27349.4 | 36825 | 29499.8 | 41256.7 | 39996.8 | 39912 | 39460.9 |
| TDS (mg/L) | 51538.9 | 73057 | 55160.7 | 80378.6 | 68269 | 66128.6 | 65381.7 |
| pH | | | | | 7.4 | 7.4 | 7.4 |

Comparison of the nanofilter data shows a subtle change in the expected permeate water quality when operated at either 45° F. or 65° F. At 45° F., the permeate quality is slightly improved in rejection of all ions, and specifically for calcium, magnesium, and sulfate, ions which are typically associated with scale formation and sulfide producing bacteria activity.

While there is a greater quality in the permeate stream (with a slight improvement in the rejection of the various ions), this improvement is balanced by an increase in pump pressure on the feed to the first array. Because the feed pressure must be increased from 343 psi to 454 psi, there is a 45% increase in power requirements that results for the nanofilter system. Thus, the improvement in the permeate stream may have an associated cost with the increased power requirements.

The reverse osmosis membranes behave similarly to the nanofilters, with respect to temperature. The temperatures considered were 45° F., 65° F., and 105° F., representing water taken from a deep seawater intake, a shallow intake, and water having gone through platform exchanger service that results in significant heating. As the temperature of the feed to the reverse osmosis membranes is increased, the permeate quality decreases from 234 ppm TDS at 45° F. to 731 TDS at 110° F. However, this increase in TDS may not necessarily be viewed as detrimental to the end use of building a polymer solution as the hardness ions remain very low at 1.3 and 0.7.

The major factor is the decrease in the power usage for developing a 100,000 barrels of water per day (bwpd) system. The first pressure at 45° F. is significantly higher than at 110° F. However, the observed boost pressure increase is in the opposite direction: more boost pressure is required at 110° F. than is required at 45° F. Overall, the power requirements decrease from 28434 kw at 45° F. to 2362 kw at 65° F., and to 1845 kw at 110° F., correlating to a 35% reduction in power requirements by using the nanofiltration before treating with reverse osmosis.

In onshore operations, the primary means for reducing the hardness of a feed water to manageable levels for use in a steam generator includes lime soda softening or evaporative techniques, which create a sludge as a by-product. However, in an offshore environment, environmental concerns closely regulate/prohibit the creation of such sludge discharge(s). Further, offshore treatment may also require cost and space limitations for a manageable operation. Using a combination of desalination approaches may allow for water treatment processes which are able to effectively and cost efficiently reduce the salinity of a sea water feed source to the TDS levels required for use of steam generators.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
   a well drilled into an underground formation comprising hydrocarbons;
   a water supply;
   a water production facility, the water production facility comprising:
      a filter to remove at least 80% of a quantity of divalent cations in the water supply;
      an exchange resin to remove at least 80% of a quantity of divalent cations in a filtered water stream that has already passed through the filter;
   a water injection facility connected to the well and the water production facility, adapted to inject the water that has passed through the exchange resin into the well.

2. The system of claim 1, further comprising:
   a second well drilled into the underground formation; and
   a hydrocarbon production facility at a topside of the second well.

3. The system of claim 1, wherein the exchange resin comprises at least one of a weak acid ion exchange resin or a chelating cation exchange resin.

4. The system of claim 1, wherein the underground formation is beneath a body of water.

5. The system of claim 1, wherein the water production facility is above a body of water.

6. The system of claim 1, further comprising a water pumping apparatus, adapted to pump water from the water supply to the water production facility.

7. The system of claim 1, wherein the water production facility has an input water having a total dissolved salts value of at least 15,000 parts per million, expressed as sodium chloride dissolved.

8. The system of claim 1, wherein the well comprises a diameter from 10 to 25 cm.

9. The system of claim 1, wherein the filter removes at least 95% of the quantity of divalent cations.

10. The system of claim 1, wherein the filter removes at least 99% of the quantity of divalent cations.

* * * * *